US005629388A

United States Patent [19]

Himelrick et al.

[11] Patent Number: 5,629,388
[45] Date of Patent: May 13, 1997

[54] PROCESS FOR PRODUCING POLYDIORGANOSILOXANE BASED GRAFT COPOLYMERS

[75] Inventors: Kenneth G. Himelrick; Kevin R. Kidder; Vijaya K. Kuruganti, all of Parkersburg, W. Va.; Hrong-Roang Sheu, Somerville, all of N.J.

[73] Assignee: General Electric Company, Pittsfield, Mass.

[21] Appl. No.: 397,316

[22] Filed: Mar. 2, 1995

Related U.S. Application Data

[63] Continuation of Ser. No. 837,838, Feb. 18, 1992, abandoned.
[51] Int. Cl.$^6$ .................................................. C08G 77/20
[52] U.S. Cl. ........................ 525/479; 525/25; 525/32; 525/34
[58] Field of Search ........................ 515/479; 528/25, 528/32

[56] References Cited

U.S. PATENT DOCUMENTS

| | | |
|---|---|---|
| 2,891,920 | 6/1959 | Hyde et al. . |
| 3,294,725 | 12/1966 | Findlay et al. . |
| 3,532,729 | 10/1970 | Cekada, Jr. et al. . |
| 3,898,300 | 8/1975 | Hilliard . |
| 4,070,414 | 1/1978 | Falender et al. . |
| 4,071,577 | 1/1978 | Falender et al. . |
| 4,226,761 | 10/1980 | Cooper et al. ............... 525/63 |
| 4,431,771 | 2/1984 | Falender et al. ............ 524/863 |
| 4,448,927 | 5/1984 | Falender et al. ............ 524/860 |
| 4,568,718 | 2/1986 | Huebner et al. ............. 524/837 |
| 4,584,341 | 4/1986 | Huebner et al. ............. 524/837 |
| 4,609,486 | 9/1986 | Freiberg et al. ............. 252/310 |
| 4,618,645 | 10/1986 | Bauman et al. .............. 524/765 |
| 4,690,986 | 9/1987 | Sasaki et al. ................ 525/479 |
| 4,812,515 | 3/1989 | Kress et al. ................... 525/69 |
| 4,927,880 | 5/1990 | DeRudder et al. ............ 525/63 |
| 4,939,205 | 7/1990 | DeRudder et al. ............ 525/63 |

FOREIGN PATENT DOCUMENTS

| | | |
|---|---|---|
| 0166900 | 1/1986 | European Pat. Off. . |
| 0246537 | 11/1987 | European Pat. Off. . |
| 0249964 | 12/1987 | European Pat. Off. . |
| 0260552 | 3/1988 | European Pat. Off. . |
| 2627502 | 8/1989 | France . |

OTHER PUBLICATIONS

Graiver et al, Emulsion Polymerized Polydimethylsiloxane, May 10–12, 1983 Rubber Chemistry & Technology, vol. 56, 918–926.

Saam, et al, Condensation Polymerization of Oligomeric Polydimethylsiloxanols in Aqueous Emulsion, Journal of Polymer Science, vol. 20, 3351–3368 (1982).

*Primary Examiner*—Ralph H. Dean

[57] ABSTRACT

A process for producing a polydiorganosiloxane based graft copolymer is provided. The process involves producing an emulsion of crosslinked polydiorganosiloxane by admixing dihydroxyfunctional polydiorganosiloxane, an emulsifying agent, and water; polymerizing the polydiorganosiloxane in the presence of an acid catalyst, a cross linking agent and a grafting agent to form silicone rubber particles having functional sites, and graft polymerizing a vinyl functional monomer onto the resulting silicone particles. The process provides several advantages in a rubber particle size control thereby resulting in better control of the properties of the resulting graft copolymer.

20 Claims, No Drawings

PROCESS FOR PRODUCING POLYDIORGANOSILOXANE BASED GRAFT COPOLYMERS

This is a continuation of Ser. No. 07/837,838 filed on Feb. 18, 1992, now abandoned.

BACKGROUND OF THE INVENTION

1. Field of the Invention

The present invention relates to processes for making polydiorganosiloxane based graft copolymers, and more particularly relates to a process for making said graft copolymers by first preparing cross-linked rubber particles from dihydroxyfunctional polydiorganosiloxane and then grafting vinyl monomer thereon.

2. Description of the Related Art

Processes for producing polyorganosiloxane based graft copolymers by (a) homogenizing organosiloxane to form a latex and polycondensating in latex form the organosiloxane with an organosiloxane graft-linking agent, and (b) graft polymerizing a vinyl monomer onto the resulting polyorganosiloxane is known, see European Patent Application 0166900 which is incorporated herein by reference. Such a process however utilized a polyorganosiloxane consisting essentially of 90 to 99.999 mole % of an organosiloxane monomer having a unit represented by the general formula $R_y^7SiO_{(4-y)/2}$ wherein $R^7$ denotes hydrogen, methyl, ethyl, propyl, or phenyl, and y denotes a number of 0, 1, or 2. Evidence has been presented in prior articles indicating that such monomer can migrate through the water phase to new polymerization sites, see J. C. Saam and D. H. Huebner, Abstracts 3$^{rd}$ International Conference, Surface and Colloid Science, Stockholm, 1979,166 (Saum et al) and Emulsion Polymerized Polydimethylsiloxane, Daniel Graiver, David J. Huebner and John C. Saam, (Graiver et al) presented at a meeting of the Rubber Division, American Chemical Society, Toronto, Ontario, Canada, May 10–12, 1983, Rubber Chemistry and Technology, Volume 56, pages 918 to 926. Monomer migration into the water phase in emulsion polymerization following homogenization can result in the formation of smaller particles during polymerization than were formed during homogenization thereby effectively making particle size control difficult.

Emulsion polymerization of hydroxy terminated oligomers of polydimethylsiloxane (MW,Mn2600) has been taught with the recognized effect of there being no evidence of migration or changes in emulsion particle size when oligomer is used instead of monomer, see Graiver et al above. Additionally, a method of producing aqueous latex of crosslinked polydiorganosiloxane has been taught, see Bauman et al, U.S. Pat. No. 4,618,645 which is incorporated herein by reference. These two references however do not teach to make graft copolymers using the resultant emulsion particles and do not teach using crosslinked polydiorganosiloxane rubber particles obtained from a process involving homogenization and polymerization of dihydroxy polydiorganosiloxane polymers as the rubber particles for graft copolymer.

Additionally it is known to adjust homogenization pressure to vary particle size, see Saam et al (J. Poly. Sci.:Poly. Chem. Ed., vol.20,3351–3368(1982), Rubber Chemistry and Technology, vol.56, no.5,918–26(1983)) wherein the effect of changing homogenizer pressure on the particle size variation was studied, but that reference does not teach to adjust viscosity of dihydroxy functional polydiorganosiloxanes to influence the particle size distribution of silicone emulsions and does not teach the use of these emulsions with controlled particle size to make impact modifiers for thermoplastic.

SUMMARY OF THE INVENTION

This invention relates to a process for producing a polyorganosiloxane based graft copolymer. The process involves homogenizing an admixture comprising dihydroxy functional polydiorganosiloxane, a grafting agent having vinyl and hydroxy or alkoxy silane functionality which is preferably a vinyl functional organosiloxane grafting agent, an emulsifying agent, a polyalkoxy crosslinking agent, and water, to form an emulsion of polydiorganosiloxane particles; emulsion polymerizing and crosslinking the polydiorganosiloxane to form silicone rubber particles having vinyl grafting sites; and graft polymerizing a vinyl monomer composition onto the silicone particles to form a graft copolymer. Use of the dihydroxy functional polyorganosiloxane instead of organosiloxane monomer provides better particle size control due in part to avoidance of the monomer migration problem. We have discovered that particle size of silicone rubber particles for graft polymers may be effectively controlled over a broad range of particle sizes by using organosiloxane polymers and by selecting and/or adjusting the viscosity of the polyorganosiloxane employed in particle size formation. Particle size control through viscosity selection permits a wider range of particle size control than can be obtained through only adjusting homogenization pressure or through only changing the monomeric silanol fluid content in the water.

DETAILED DESCRIPTION OF THE INVENTION

The process of the present invention involves producing a polyorganosiloxane based graft copolymer by (a) preparing an aqueous emulsion of polydiorganosiloxane particles by homogenizing dihydroxy functional polydiorganosiloxane in water; (b) polymerizing and crosslinking the polydiorganosiloxane to form silicone rubber particles; and (c) graft-polymerizing at least one vinyl monomer onto the resulting silicone particles to form a polyorganosiloxane based graft copolymer.

A suitable method for preparing silicone emulsions is set out in Bauman et al U.S. Pat. No. 4,618,645 which is incorporated herein by reference.

The following process is a suitable method for making the vinyl functional particles of crosslinked polydiorganosiloxane which will serve as a rubber substrate for the graft copolymer. An aqueous latex of vinyl functional crosslinked polydiorganosiloxane may be prepared by (A) homogenizing immediately after admixing, an admixture comprising 100 parts by weight of dihydroxy functional polydiorganosiloxane of the formula $HO(R_2SiO)_xH$ wherein each R is a radical selected from the group consisting of methyl, ethyl, propyl, phenyl, vinyl, allyl, and 3,3,3-trifluoropropyl, and x has an average value of at least 10, and preferably from 10 to 100; from 0.1 to 15 parts by weight of a polyalkoxy crosslinking agent, preferably a polyalkoxy silicon compound which is selected from the group consisting of silane of the formula $R_a^1Si(OR^2)_{4-a}$ where $R^1$ is a monovalent hydrocarbon radical having up to 12 carbon atoms, $R^2$ is an alkyl radical having from 1 to 6 inclusive carbon atoms, and a is 0 or 1, or the crosslinking agent may be optionally a partial hydrolyzate of the silane when the partial hydrolyzate is soluble in the polydiorganosiloxane or mixture of silane and partial hydrolyzate; sufficient anionic emulsifying agent to give a stable emulsion particles of polydiorganosiloxane; water, to give a non-volatile content of from 10 to 80 percent by weight; and a vinyl functional organosiloxane grafting agent; then, (B) maintaining the emulsion in presence of an acid catalyst at a temperature of from 1° C. to 30° C. until the desired molecular weight and crosslinking of the polydiorganosiloxane is obtained, then (C) adding sufficient base to raise the pH of the emulsion to between 6 and 8 to form a latex of vinyl function silicone rubber particles. Preferably the catalyst is present at a level of from 1.5 to 100 millimoles per kilogram of polydiorganosiloxane.

A method of producing an aqueous latex of cross-linked polydiorganosiloxane wherein the acid catalyst is added to the emulsion of polydiorganosiloxane after the emulsion is formed, may be substituted by procedures involving adding the surface active acid catalyst prior to homogenization. Alternatively a base catalyst may be employed in the admixture involving a pH of greater than 9 until cured followed by lowering the pH to between 6 and 8.

Preferably sufficient water is used in the latex to give a solids content of from 10 to 80 percent by weight preferably 20 to 50 percent by weight. This latex of vinyl functional crosslinked silicone particles is then used as the substrate for the graft copolymers of the present invention.

The method of producing a latex of crosslinked polydiorganosiloxane can be further modified by including colloidal silica reinforcement in the initial admixture. The colloidal silica may be in the form of an acidic silica sol. The water of the admixture present in the acidic silica sol can be used as the water of the admixture or as a portion of it if desired. Because of this, it is possible to make a latex having a solids content as high as 80 percent by weight. Even higher solids contents could be produced, but it becomes difficult to obtain the desired dispersed phase of polydiorganosiloxane in a continuous water phase if less than this amount of water is present.

The dihydroxy functional polydiorganosiloxanes are preferably hydroxyl endblocked polydiorganosiloxanes which are well known in the art. The hydroxyl endblocked polydiorganosiloxane can be any of the dihydroxy functional polydiorganosiloxanes which are endblocked with hydroxyl radicals and can be represented by the formula HO(R$_2$SiO)$_x$H where each R is a radical selected from the group consisting of methyl, ethyl, propyl, phenyl, vinyl, allyl, and 3,3,3-trifluoropropyl, and mixtures thereof preferably wherein at least 50 percent of the radicals are methyl radicals. The polydiorganosiloxane can be a single type polymer with the same kind of repeating diorganosiloxane units or it can be a combination of two or more kinds of repeating diorganosiloxane units, such as combinations of dimethylsiloxane units and methylphenylsiloxane units. The polydiorganosiloxane can also be a mixture of two or more kinds of polydiorganosiloxanes. The polydiorganosiloxanes are those in which x is an average value of at least 10, and preferably from 10 to 100. Preferably the admixture is essentially free of monomers and dimers wherein x is 1 or 2 and preferably contains a combined total less than 5 percent by weight of organosiloxane monomers, dimers, trimers and tetramers based on the total weight of the polydiorganosiloxanes, and preferably the admixture is essentially free of organosiloxane monomers of the formula R$_y^7$SiO$_{(4-y)/2}$ wherein R$^7$ and y are defined above and preferably contains less than 5 percent by weight thereof based on the total weight of the polydiorganosiloxanes. The preferred polydiorganosiloxanes are those in which x is at least large enough that the viscosity of the polydiorganosiloxane is at least 0.005 Pa.s at 25° C. A preferred polydiorganosiloxane is a polydimethylsiloxane having a viscosity of from about 0.005 Pascal-second (Pa.s) to 0.15 Pa.s at 25° C., the value of x for such a material being from about 25 to 80. More preferably the dihydroxy functional polydiorganosiloxane has a viscosity of between 0.015 Pa.s and 0.080 Pa.s at 25° C.

The alkoxy silicon compound used in the method of this invention acts as a crosslinking agent and is selected from the group consisting of silane of the formula R$^1_a$Si(OR$^2$)$_{4-a}$ where R$^1$ is a monovalent hydrocarbon radical having up to 12 carbon atoms, R$^2$ is an alkyl radical having from 1 to 6 inclusive carbon atoms, and a is 0 or 1; a partial hydrolyzate of the silane where the partial hydrolyzate is soluble in the polydiorganosiloxane; and mixtures of the silane and the partial hydrolyzate. These alkoxy silicon compounds are well-known in the art and many are commercially available. R$^1$ can be illustrated by radicals such as methyl, ethyl, propyl, isopropyl, butyl, hexyl, dodecyl, vinyl, allyl, phenyl, tolyl, and 3,3,3-trifluoropropyl. R$^2$ is an alkyl radical such as methyl, ethyl, propyl, and hexyl. Preferably both R$^1$ and R$^2$ are methyl. Preferred silanes include methyltrimethoxysilane and ethylorthosilicate. A preferred partial hydrolyzate of silane is that of tetraethoxysilane.

The amount of alkoxy silicon compound present can vary from 0.1 to 15 parts by weight based upon 100 parts by weight of the dihydroxy functional polydiorganosiloxane with a preferred amount of from 1 to 5 parts by weight. The amount of alkoxy silicon compound used has an effect upon the degree of crosslinking in the emulsion polymer. The preferred amount of crosslinker is dependent upon the polydiorganosiloxane used, the alkoxy silicon compound used, the time allowed for reaction, and the type and amount of surface active acid catalyst. The preferred amount of crosslinker is determined by the graft polymers physical property requirements. Higher amounts of alkoxy silicon compound cause more crosslinking.

The anionic emulsifying agent is preferably an alkali metal surface active sulfonate or sulfate. The emulsifying agent can be any of those known to be useful for producing emulsions of polydiorganosiloxanes and water, such as alkali metal sulforesorcinates; sulfonated glyceryl esters of fatty acids; salts of sulfonated monovalent alcohol esters; amides of amino sulfonic acid, such as the sodium salt of oleyl methyl tauride; sulfonated aromatic hydrocarbon alkali salts, such as sodium alpha-naphthalene monosulfonate; condensation products of napthalene monosulfonate; condensation products of naphthalene sulfonic acids with formaldehyde; and sulfates, such as sodium lauryl sulfate, triethanol amine lauryl sulfate, and sodium lauryl ether sulfate. Preferred is the sodium salt of dodecylbenzene sulfonic acid.

A surface active acid catalyst may be used to catalyze the polymerization of the dihydroxy functional polydiorganosiloxane. The catalyst is a surface active sulfonic acid catalyst or a surface active hydrogen sulfate catalyst. The preferred surface active acid catalyst is selected from the group consisting of a compound of the formula R$^3$C$_6$H$_4$SO$_3$H wherein R$^3$ is a monovalent hydrocarbon radical of at least 6 carbon atoms; a compound of the formula R$^3$OSO$_2$OH wherein R$^3$ is as defined above; a compound of the formula:

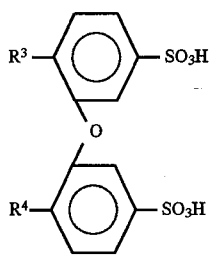

wherein $R^3$ is as defined above and $R^4$ is H or $R^3$, and mixtures thereof. $R^3$ contains at least 6 carbon atoms, and preferably no more than about 18 carbon atoms. $R^3$ may be selected from hexyl, octyl, decyl, dodecyl, cetyl, myricyl, nonenyl, phytyl, and pentadecadienyl radicals. Most preferable $R^3$ has at least 10 carbon atoms. Preferred $R^3$ is the dodecyl radical.

The surface active acid catalyst catalyzes the polymerization of the dihydroxy functional polydiorganosiloxane.

The sulfonic acids are available commercial products. The preferred sulfonic acids are dodecylbenzene sulfonic acid and dodecyldiphenyloxidedisulfonic acid. Hydrogen lauryl sulfate may be obtained by dissolving sodium lauryl sulfate in water, then adding hydrogen chloride to form the hydrogen lauryl sulfate and sodium chloride. Another method treats the sodium lauryl sulfate solution with a cation exchange resin which exchanges sodium ion for hydrogen ion. The solution of hydrogen lauryl sulfate is then used as the catalyst in the method of this invention. The hydrogen lauryl sulfate can also be produced in situ by homogenizing the polydiorganosiloxane, alkoxy silicon compound, with sodium lauryl sulfate, then adding hydrogen chloride to the emulsion formed by the homogenization to convert the sodium lauryl sulfate to hydrogen lauryl sulfate catalyst. This in situ process is considered to fall within the scope of the claims.

Suitable grafting agents have both vinyl functionality and hydroxy or alkoxy or aryloxy functionality and are preferably vinyl functional organosiloxane grafting agent. Preferred grafting agents are of the general formula:

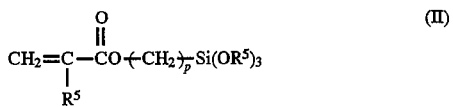

wherein each $R^5$ is independently selected from hydrogen, methyl, ethyl, propyl or phenyl; and p denotes a number of from 1 to 6. The preferred grafting agent is 3-methacryloxypropyltrimethoxysilane.

Suitable crosslinking agents are the poly alkoxysiliane compounds set out above. The preferred crosslinking agent is tetraethoxysilane. The crosslinking composition used in conjunction with the organosiloxane component of the present compositions can have the general formula

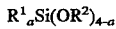

as defined above. When $R^1$ is a vinyl, alkenyl, thio, or acryloxyalkyl radical and a is 1, the cross-linker compound can also act as a graftlinking agent.

A preferred crosslinking compound is tetraethoxysilane. A combination crosslinking and graftlinking compound is vinyltriethoxysilane. Another suitable choice is gamma-methacryloxypropyltrimethoxysilane.

The preferred acid catalyst also serves as a emulsifying agent and is dodecyl benzene sulfonic acid.

The preferred hydroxy terminated polydiorgano siloxanes are hydroxy terminated polydimethyl siloxanes having viscosities of from 0.005 Pascal-seconds to 0.15 Pascal-seconds at 25° C.

The emulsion of vinyl functional crosslinked polydiorganosiloxane can be reinforced by from 5 to 50 parts by weight of colloidal silica per 100 parts by weight of dihydroxy functional polydiorganosiloxane, in the form of an acidic sol in water. The acidic silica sols are commercially available dispersions of colloidal silica in water. They typically have a pH of about 3. A typical sol contains about 34 percent by weight of colloidal silica having an average particle size of about 20 nanometers, with a pH of about 3.2.

The colloidal silica may be in the form of an acidic sol in water. By using the water in the sol as the water to form the emulsion of polydiorganosiloxane and colloidal silica, the latex produced can have a higher total solids content than if the polydiorganosiloxane were hydrolyzed and polymerized, then reinforced by adding a colloidal silica sol.

The method of this invention can involve first homogenizing an admixture of the hydroxyl endblocked polydiorganosiloxane, the crosslinking agent, the anionic emulsifying agent, and the grafting agent with water. The homogenization can be done by any of the known means of producing homogenized material such as a colloid mill or a microfluidizer. The homogenized material is in the form of an oil-in-water emulsion; that is, an emulsion of particles of polydiorganosiloxane, crosslinking agent, grafting agent, and alkoxy silicon compound in a continuous water phase. Based upon 100 parts by weight of polydiorganosiloxane, from 0.1 to 15 parts by weight of an alkoxy silicon compound are used. The higher the level of crosslinking agent used, the more crosslinking of the resulting polymer. If too much crosslinking agent is used, the resulting polymer will have too much crosslinking and will be more rigid in its properties than elastomeric. The primary control of particle size is achieved by control of viscosity of the hydroxy siloxane.

Preferably, a catalyst may be incorporated into the additive prior to homogenization, alternatively the catalyst may be incorporated into the emulsion by adding the catalyst to the emulsion after homogenization. In either case, the goal is to produce a catalyzed emulsion. When added to the emulsion, the catalytic surfactant migrates to the surface of the polydiorganosiloxane micelles, where it catalyzes the condensation of the hydroxyl endblocked polydiorganosiloxane and the alkoxy silicon compound to produce a crosslinked polydiorganosiloxane. The polymerization takes place at a temperature of from 1° C. to 30° C., preferably from 15° C. to 30° C., with a rate sufficiently rapid to be practical. A minimum time of 5 hours is typically necessary in order to allow a significant increase in the molecular weight of the polydiorganosiloxane and the formation of a crosslinked structure. After the reaction has proceeded to the desired degree, the pH of the emulsion is raised by admixing a basic material into the emulsion in sufficient amount to raise the pH to between 6 and 8, preferably about 7. A preferred method of raising the pH uses a dilute solution of sodium hydroxide or ammonium hydroxide or diethylamine. The preferred amount of reaction is a function of the intended properties of the final graft polymer. The resultant vinyl functional crosslinked polydiorganosiloxane particles may also be referred to as silicone rubber particles having vinyl functional sites thereon.

The aqueous emulsion of vinyl functional crosslinked polydiorganosiloxane can be further mixed with additional ingredients. Any additive should be tested to assure that the stability and usefulness of the emulsion is not adversely effected.

The homogenization step of this invention can be modified to give an emulsion of vinyl functional crosslinked rubber particles which also contains reinforcing colloidal silica. This is done by including from 5 to 50 parts by weight of colloidal silica present as an acidic sol in water in the initial admixing. The acidic colloidal silica sol is described above. A suitable acidic colloidal silica sol is commercially available material; for example, Nalcoag 1034A, obtainable from Nalco Chemical Company. The sol may be mixed with the other ingredients to form the admixture which is homogenized together to form the emulsion. The colloidal silica then is present during the polymerization step which is preferably carried out at a pH of less than 5. The ingredients are allowed to react until the desired degree of polymerization and crosslinking has taken place. The amount of reaction can be monitored by taking samples from the reaction mixture, and raising the pH to between 6 and 8 to stop the reaction. If too high an amount of colloidal silica is used, the product will no longer have elastomeric properties. The properties of this reinforced, crosslinked polydiorganosiloxane latex can also be varied by the addition of other ingredients such as thickeners, pigments, additional reinforcing, or extending filler, and heat stability ingredients such as those known for use with silicon elastomers.

The silicone particle size may be effectively controlled by selection and/or adjustment of the viscosity of the polydiorganosiloxane fluid prior to homogenization. Viscosity of the fluid may be adjusted by mixing two polyorganosiloxane fluids having different viscosities, for example, a polydiogonanosiloxane having a viscosity of 35 centipoise may be mixed in appropriate relative amounts with a polydiorganosiloxane having a viscosity of 80 centipoise to form a viscosity of 50 centipoise. By controlling particle size the property of the resultant graft polymer may be appropriately controlled. Preferably the volume average mean particle diameter of the crosslinked particles are from between 350 Å and 9000 Å, and more preferably from between 3000 Å and 9000 Å and preferably exhibit a somewhat Gaussian distribution of the particle sizes.

The vinyl monomers useful in forming the graft portion of the graft polymer are preferably alkenyl aromatic compounds such as styrene, divinylbenzene, alpha-methylstryrene, vinyl toluene, vinyl naphthalene, vinyl anthracene, and halogenated styrene or its derivatives. Other suitable vinyl monomers include acrylic acids and acrylates such as methyl-, ethyl-, allyl-, or butyl-acrylate; methacrylates such as methyl methacrylate or 2-ethylhexyl methacrylate; vinyl cyanides such as acrylonitrile or methacrylonitrile; olefins such as ethylene, propylene, butadiene, isoprene, chloroprene, vinylimidazole, 5-vinyl-2-norbornene, vinyl pyridine, vinyl pyrrolidine, vinyl acetate, vinyl alkyl ethers, vinyl chloride, vinyl furan, N-vinyl carbazole, allyl (meth)acrylate, triallylisocyanurate, ethylene di(meth)acrylate, butylene di(meth)acrylate, diallyl maleate, maleic andydride; maleimide compounds such as lameimide or N-phenyl (or alkyl) maleimides, acrylamides, N-(mono or di-substituted) acrylamides; and mixtures of any of these monomers. In general, any vinyl type monomer may be used which is polymerizable with the vinyl functional crosslinked polyorganosiloxane particles. Typically, the graft portion of the graft polymer will be present in an amount of approximately 3 to 97 weight percent based on the total weight of the graft polymer, and correspondingly, the crosslinked polyorganosiloxane component will be present in an amount of approximately 97 to 3 weight percent based on the total weight of the graft polymer. Preferably, the graft portion will comprise approximately 5 to 85 weight percent of the graft polymer based on the total weight of the graft polymer. The vinyl monomers are graft polymerized onto the vinyl functional crosslinked particles to form the desired graft copolymer.

Preferably the polydiorganosiloxane fluid that is to undergo homogenization is essentially free of cyclic organosiloxane monomers of the formula:

wherein $R^6$ is hydrogen or a monovalent hydrocarbon radical of from 1 to 16 carbon atoms and m is 1, 2, 3 or 4. Preferably the cyclic monomers are present at a level of less than 5% by weight based on the total weight of the polydiorganosiloxanes, more preferably at a level of less than 1% by weight based on the total weight of polydiorganosiloxane, and most preferably at a level of less than 0.1% by weight based on the total weight of polydiorganosiloxane. The presence of high amounts of the organosiloxane monomers in the admixture during homogenization can lead to monomer migration through the water phase during and prior to polymerization leading to particle size redistribution following homogenization and the formation of smaller particles. This migration of monomer results in a decreased ability to control particle size of the resultant silicone rubber particles, thus resulting in a decreased ability to control the final properties of the graft polymer, because graft polymer properties such as impact strength are determined in large part by the particle sizes and particle size distribution of the rubber particles in the graft polymer. Thus by using a polyorganosiloxanes instead of low molecular weight cyclic organosiloxane monomers, dimers, trimers and tetramers, the control of the final properties of the graft polymer can be enhanced.

Additionally, applicants have discovered that by controlling the viscosity of the polydiorganosiloxane fluid used, the resultant size of the rubber particles can be better controlled than by simple use of pressure or oil content during homogenization. Particle size control based on viscosity of silanol fluids gives a much broader window than particle size control by changing homogenization pressure, or changing silanol fluid content in water.

EXAMPLES

Stable silicone emulsions with various controlled particle size distributions have been prepared by changing the viscosities (15–80 cs) of silanol fluids (dihydroxy terminated polydimethylsiloxanes), amount of soap, homogenization pressure and oil (Silanol) content in water used to make silicone rubber substrates. It was observed that particle size control by changing viscosity of silanol fluids is much more effective than particle size control achieved by changing homogenization pressure or oil (Silanol) content in water. Room temperature polymerization and crosslinking of these silicone emulsions resulted in silicone rubber substrates in excellent yields. These rubber substrates were neutralized with aqueous sodium hydroxide and grafted with styrene and acrylonitrile under free radical conditions via graft sites provided by methacryloxypropyltrimethoxysiloxane present in silicone rubber substrates. These grafted silicone rubbers were compounded into styrene-acrylonitrile copolymers at 20 parts rubber level which yielded notched izod impacts up to 2.9 ft-lb/in. at room temperature.

Silicone emulsions are prepared by taking hydroxyterminated polydimethylsiloxanes of two different viscosity ranges (15–35 cs and 80 cs (purchased from Huls America)) and prereacting them with 3-methacryloxypropyltrimethoxysilane(grafting agent) in the presence of dodecylbenzenesulfonic acid(acid catalyst as well as surfactant. To these mixtures tetraethoxysilane (cross-linking agent), Ultrawet® 42K sodium salt of dodecyl benzene sulfonic acid surfactant, and water were added prior to homogenization using microfluidizer. Three passes produced stable emulsions and particle size distributions (volume weighting) as listed in Table I were determined by Nicomp submicron particle size analyzer.

TABLE I

| Sample ID # | Viscosity of silanol fluids (cs) | Oil Content (% in water) | Pressure (psi) | Soap (% silanols) | Mean Particle diameter (A°) |
|---|---|---|---|---|---|
| 2073-13 | 15–35 | 25.24 | 8000 | 1.1 | 2000 (Gaussian) |
| 2073-17 | 15–35 | 25.24 | 6500 | 1.1 | 2400 (Gaussian) |
| 2073-18 | 15–35 | 25.24 | 5000 | 1.1 | 2700 (Gaussian) |
| 2073-23 | 15–35 | 40.00 | 8000 | 1.0 | 2750 (Gaussian) |
| 2073-25 | 15–35 | 50.00 | 8000 | 1.0 | 2860 (Gaussian) |
| 2073-27 | 15–35 | 50.00 | 5000 | 1.0 | 2980 (Gaussian) |
| 2073-14 | 80 | 25.24 | 8000 | 1.1 | 9000 (Gaussian) |
| 2073-19 | 80:15–35 (1:1) | 25.24 | 8000 | 1.1 | 3000 (Gaussian) |
| 2073-21 | 80:15–35 (3:1) | 25.43 | 8000 | 1.1 | 5900 (Gaussian) |
| 2073-20 | 80:15–35 (3:1) | 25.01 | 8000 | 2.74 | 2900 (Gaussian) |
| 2073-22 | 80 | 40.00 | 12000 | 2.00 | 5800 (Gaussian) |

A centipoise (CS) unit is equal to 0.001 Pascal-second

From these results it is evident that a greater change in particle size distribution can be achieved by changing viscosity of silanol fluids rather than changing homogenization pressure or oil (Silanol) content in water. After polymerization at room temperature these rubber substrates were neutralized with 2% sodium hydroxide solution and grafted with styrene and acrylonitrile using potassium persulfate as the initiator. When these styrene-acrylonitrile grafted silicone rubbers were compounded into 72:28 styrene to acrylonitrile weight ratio copolymer and tested for notched izod impact (ASTM-D256) they yielded up to 2.9 ft-lb/in. at room temperature.

What is claimed is:

1. A process for producing a polyorganosiloxane-based graft copolymer with controlled particle size distributions, said process comprising:
   (a) homogenizing an admixture comprising:
   (i) dihydroxy functional polydiorganosiloxane, having a viscosity selected from between 0.005 Pa.S and 0.15 Pa.S as measured at 25° C.,
   (ii) a vinyl functional organosiloxane grafting agent,
   (iii) an emulsifying agent,
   (iv) water, and
   (v) a polyalkoxysilane crosslinking agent, to form an emulsion of polydiorganosiloxane particles,
   (b) maintaining the emulsion in the presence of an acid catalyst at a temperature of from 15° to 30° C. at a pH of less than 5 until the desired molecular weight and level of crosslinking of the polydiorganosiloxane is obtained to form vinyl functional silicone rubber particles;
   (c) adjusting the pH of the emulsion to between 6 and 8;
   (d) graft-polymer/zing at least one vinyl monomer onto the resulting silicone rubber particles to form a graft polymer, whereby the polyorganosiloxane-based graft copolymer has particle sizes ranging from 350 Angstroms to 9000 Angstroms.

2. The process of claim 1 wherein said admixture comprises an acid catalyst.

3. The process of claim 1 wherein said grafting agent and said crosslinking agent are chemically combined as a single additive.

4. The process of claim 1 wherein said dihydroxy functional polydiorganosiloxane has the formula:

$$HO(R_2SiO)_xH$$

wherein each R is a radical selected from the group consisting of methyl, ethyl, propyl, phenyl, vinyl, allyl, and 3,3,3-trifluoropropyl, and x is an average value in the range of from 10 to 100 inclusive.

5. The process of claim 1 wherein the grafting agent is represented by the formula:

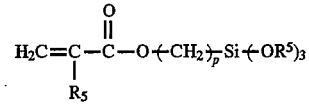

wherein each $R^5$ is independently hydrogen, methyl, ethyl, propyl or phenyl groups, or p is a number of 1 to 6.

6. The process of claim 1 wherein said dihydroxy functional polydiorganosiloxane has a viscosity of between 0.015 Pascal seconds and 0.08 Pascal seconds at 25° C.

7. The process of claim 4 wherein x is between 25 and 80.

8. The process of claim 1 wherein said vinyl monomer composition is selected from the group consisting of styrene, acrylonitrile and mixtures thereof.

9. A process for producing a polydiorganosiloxane-based graft copolymer with controlled particle size distributions, which comprises;
   (a) homogenizing an admixture to form an emulsion of polydiorganosiloxane particles, said admixture comprising:
   (i) polydiorganosiloxane of the formula:

$$HO(R_2SiO)_xH$$

wherein each R is a radical selected from the group consisting of alkyl and alkene radicals, and wherein the average x is between 10 and 100,
   (ii) a vinyl functional organosiloxane grafting agent,
   (iii) an emulsifying agent,
   (iv) a crosslinking agent, and
   (v) water,
   (b) maintaining the catalyzed emulsion at a temperature of from 1° C. to 30° C. at a pH of less than 5 until the desired molecular weight and level of crosslinking of the polydiorganosiloxane is obtained to form vinyl functional silicone rubber particles; and (c) graft polymerizing a vinyl monomer composition onto the resulting silicone rubber particles, whereby the polysiloxane-based graft copolymer has particle sizes ranging from 350 Angstroms to 9000 Angstroms.

10. The process of claim 9 wherein said vinyl monomer composition is selected from the group consisting of styrene, acrylonitrile, methylmethacrylate and mixtures thereof.

11. A process for producing a polydiorganosiloxane-based graft copolymer with controlled particle size distributions, which comprises:

(a) mixing at least two polydiorganosiloxane fluids each of the formula:

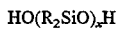

wherein each R is a radical selected from one group consisting of alkyl and alkene radicals and wherein at least two of said fluids have viscosity differences of at least 0.02 Pa.S at 25° C. to form an admixture having a desired viscosity;

(b) homogenizing said admixture to form emulsions;

(c) polymerizing said polydiorganosiloxanes in the presence of catalyst, crosslinking agents and grafting agent to form vinyl functional silicone rubber particles, and;

(d) graft polymerizing a vinyl monomer composition onto the resulting silicone particle, whereby the polysiloxane-based graft copolymer has particle size ranging from 350 Angstroms to 9000 Angstroms.

12. A process for producing a polyorganosiloxane based graft polymer with controlled particle size distributions, said process comprising:

(a) preparing an aqueous emulsion by homogenizing a dihydroxy functional polydiorganosiloxane fluid;

(b) polymerizing the polydiorganosiloxane in the presence of a vinyl functional grafting agent and a crosslinking agent to form silicone rubber particles having vinyl grafting sites; and (c) graft-polymerizing a vinyl monomer composition onto the resultant silicone rubber particles to form a polyorganosiloxane based graft polymer, whereby the polysiloxane-based graft copolymer has particle size ranging from 350 Angstroms to 9000 Angstroms.

13. The process of claim 12 wherein said vinyl monomer composition is selected from the group consisting of styrene, acrylonitrile and mixtures thereof.

14. A process for making a graft copolymer having controlled particle size distributions comprising:

(a) preparing an emulsion by homogenizing dihydroxy functional polydiorganosiloxane polymers;

(b) polymerizing and crosslinking the polydiorganosiloxane polymers in the presence of a vinyl functional grafting agent to form vinyl functional rubber particles; and (c) graft polymerizing at least one vinyl monomer on to the rubber particles to form a graft copolymer, whereby the polysiloxane-based graft copolymer has particle size ranging from 350 Angstroms to 9000 Angstroms.

15. The process of claim 14 wherein said vinyl monomer composition comprises vinyl monomers selected from the group consisting of vinyl aromatic monomers, vinyl cyanide monomers, acrylates and mixtures thereof.

16. The process of claim 1, wherein the polysiloxane-based graft copolymer has particle sizes ranging from 3000 Angstroms to 9000 Angstroms.

17. The process of claim 9, wherein the polysiloxane-based graft copolymer has particle sizes ranging from 3000 Angstroms to 9000 Angstroms.

18. The process of claim 11, wherein the polysiloxane-based graft copolymer has particle sizes ranging from 3000 Angstroms to 9000 Angstroms.

19. The process of claim 12, wherein the polysiloxane-based graft copolymer has particle sizes ranging from 3000 Anstroms to 9000 Angstroms.

20. The process of claim 14, wherein the graft copolymer has particle sizes ranging from 3000 Angstroms to 9000 Angstroms.

* * * * *